United States Patent [19]

Takeda et al.

[11] Patent Number: 4,551,846
[45] Date of Patent: Nov. 5, 1985

[54] FSK DEMODULATION CIRCUIT

[75] Inventors: Koji Takeda; Masao Akahane; Fumiaki Mukaiyama; Yasuhiko Kudo, all of Suwa, Japan

[73] Assignee: Kabushiki Kaisha Suwa Seikosha, Tokyo, Japan

[21] Appl. No.: 376,059

[22] Filed: May 7, 1982

[30] Foreign Application Priority Data

May 8, 1981 [JP] Japan .................................. 56-69137

[51] Int. Cl.⁴ ............................................ H04L 27/14
[52] U.S. Cl. ....................................... 375/82; 375/88; 329/104
[58] Field of Search ....................... 375/45, 47, 49, 88, 375/90, 91; 455/615; 329/104, 106, 107; 340/825.58

[56] References Cited

U.S. PATENT DOCUMENTS

| | | | |
|---|---|---|---|
| 3,715,666 | 2/1973 | Mueller et al. | 375/13 |
| 3,846,708 | 11/1974 | Franco | 375/82 |
| 3,908,169 | 9/1975 | Tong | 375/82 |
| 3,947,769 | 3/1976 | Rousos et al. | 375/91 |
| 4,021,744 | 5/1977 | Montefusco | 375/82 |
| 4,044,202 | 8/1977 | Antoszewski | 375/88 |
| 4,115,738 | 9/1978 | Mitarai et al. | 375/82 |
| 4,378,526 | 3/1983 | Champagne et al. | 375/88 |

OTHER PUBLICATIONS

"Data Transmission" by Kyoritsu Publishing Company, 1975, pp. 105-131 and 218-221 (Cover identification D.15.8).
W. R. Bennett & J. R. Davey, "Data Transmission", McGraw-Hill Book Co., 1965.
R. W. Lucky, J. Salz & E. J. Weldon, "Principle of Data Communication", McGraw-Hill Book Co., 1968.
John Wiley, 1966, "Phaselock Techniques".

Primary Examiner—Robert L. Griffin
Assistant Examiner—Stephen Chin
Attorney, Agent, or Firm—Blum, Kaplan, Friedman, Silberman & Beran

[57] ABSTRACT

A FSK demodulation circuit using counter techniques to distinguish between two transmitted frequencies, provides a delay preceding the change points of the demodulated signal to reduce signal distortion. Presettable counters reduce the number of data bits for processing, and a plurality of counters count an equal plurality of zero-cross intervals to reduce distortion. Registers and multiplexer further reduce circuit complexity.

11 Claims, 20 Drawing Figures

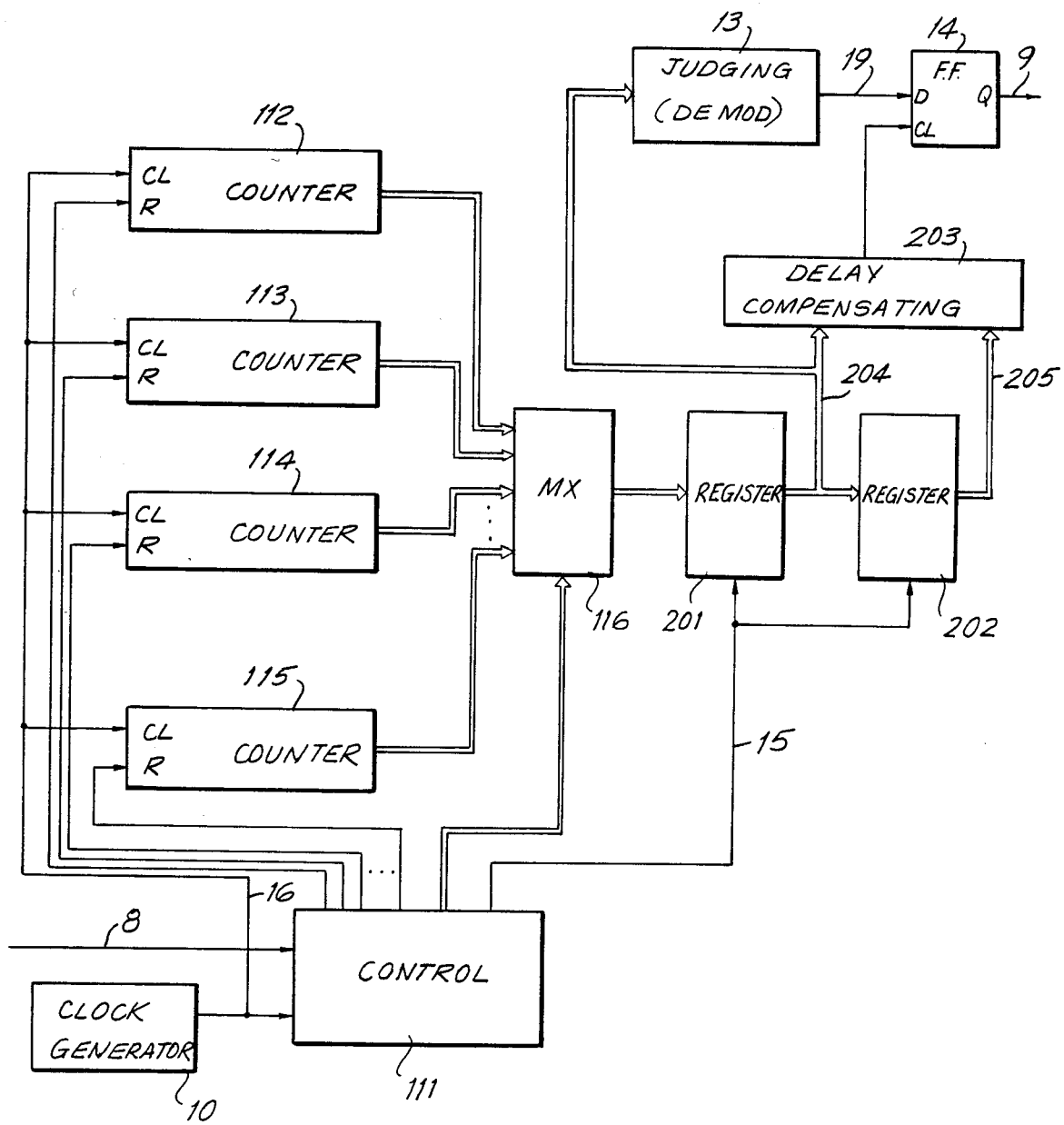

FSK DEMODULATION CIRCUIT

BACKGROUND OF THE INVENTION

This invention relates generally to a FSK demodulation circuit of the type used in communication networks employing binary transmission signals and more particularly to a FSK demodulation circuit which reliably detects signals having low signal to noise ratio with minimum distortion. There are well-known FSK demodulation circuits such as the frequency discriminator type, zero-crossing type, differential demodulation type and phase-locked loop type (PLL). However, because when analog circuit techniques are employed, the FSK demodulation circuits include a large number of components and consequently are often in need of adjustment. Further, the circuit is large in size, high in production cost and long term reliability of operation is low. Of great significance, such circuits cannot be fully integrated for miniaturization.

What is needed is a FSK demodulation circuit which provides excellent detection of low signal to noise ratio communications, with low distortion and by means of an entirely integrated circuit.

SUMMARY OF THE INVENTION

Generally speaking, in accordance with the invention, a FSK demodulation circuit which operates on digital techniques is provided as compared with the conventional FSK demodulation circuits using analog methods. The FSK demodulation circuit in accordance with the invention can be integrated on a single chip. In the FSK demodulation circuit, an originally transmitted binary signal is demodulated by counting during zero-crossing detection intervals in the signal and providing a comparison between the count and a standard comparison value.

A plurality of counters are used for counting during a plurality of successive intervals between successive zero-cross points. The number of successive zero-cross points which are counted in each counter equals the number of counters which are used. Thus, at each zero-cross point another counter of the plurality of counters commences its count. The one or zero quality of the signal is demodulated by comparing the count between the plurality of zero-cross points against an average value of counts produced by periods of the two transmission frequencies. As a result, a signal having a high noise level is demodulated.

The changing point in the original binary signal of the FSK signal is estimated based on the count value of the zero-cross detection. With the counting technique, time delays can occur, which distort the detected signal by causing delays in the changes from one to zero and zero to one. In order to make the delay time constant from the above mentioned original changing point to that of the changing point of the demodulated binary signal, a delay compensating circuit is provided. This compensating circuit eliminates jitter.

Accordingly, it is an object of this invention to provide an improved FSK demodulation circuit which reliably detects FSK signals having a low signal to noise ratio.

Another object of this invention is to provide an improved FSK demodulation circuit which bases detection between ones and zeros in the transmitted signal by counting a plurality of zero-cross point intervals to determine the transmitted signal frequency.

A further object of this invention is to provide an improved FSK demodulation circuit which minimizes detection errors present where zero-cross points are inaccurately located.

A further object of this invention is to provide an improved FSK demodulation circuit which provides for uniform delay in changes from zero to one and one to zero in the demodulated signals.

Still other objects and advantages of the invention will in part be obvious and will in part be apparent from the specification.

The invention accordingly comprises the features of construction, combination of elements and arrangement of parts which will be exemplified in the constructions hereafter set forth, and the scope of the invention will be indicated in the claims.

BRIEF DESCRIPTION OF THE DRAWINGS

For a fuller understanding of the invention, reference is had to the following description taken in connection with the accompanying drawings in which:

FIG. 7 is a circuit block diagram of an alternative FSK demodulation circuit in accordance with the invention;

DESCRIPTION OF THE PREFERRED EMBODIMENTS

This invention relates to a FSK demodulation circuit operating with a counter technique for demodulating an original binary signal using a value obtained by measuring intervals between zero-cross points in the FSK signal. The interval between the zero-cross points corresponds to half of the period of the FSK signal. In accordance with the invention, a modulator-demodulator circuit can easily be integrated with very little distortion of the demodulated signal.

A FSK communication system is generally used in data communication. Such a system belongs to a so-called frequency modulator-demodulator system in which signals having different sine wave frequencies are sent or received in correspondence to a digitized binary signal of one or zero. Such a frequency system is primarily used as an acoustic coupled modem or a low speed modem.

Figure 1A:
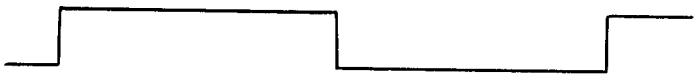
FIGS. 1A and 1B are waveforms of an original binary signal and a corresponding FSK signal, respectively.
Figure 1B:
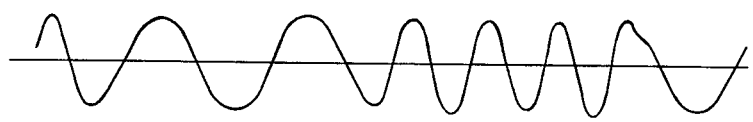

FIG. 1A shows the waveform of a digitized binary signal and FIG. 1B shows the same signal which is frequency modulated for transmission. The one portion of the signal of FIG. 1A is transmitted in the signal of FIG. 1B at a lower frequency than the zero portions. Because analog techniques like frequency discriminating systems and PLL systems have generally been used for demodulation, a FSK modem is required to have a large plurality of individual parts and consequently adjustment is frequently needed. Thus, it is difficult to miniaturize such a circuit, long term stability is poor and manufacturing costs are high.

To the contrary, a system is possible which retrieves an original binary signal by demodulation, that is, by detecting zero-cross points in the FSK signal. Then, by counting on a counter during the zero-cross detection intervals of the signal, corresponding to half of the period of the modulating frequency wave, comparison values are obtained by checking against a preselected count standard. Demodulation circuits of the counter technique are for the most part digital circuits and can be integrated for miniaturization. Especially where the modulation circuits are also digital circuits, modulator-demodulator devices can be integrated in a single integrated circuit chip. Moreover, improvement in reliability, cost reduction and reduction in power consumption are achieved.

With reference to demodulation, a disadvantage is quite unavoidable in a counter system in that demodulation of a signal having a low signal to noise ratio is subject to an increase in signal distortion or even an impossibility of demodulation, that is, erroneous demodulation due to susceptibility to errors in detecting the zero-cross point due to noises in the signal.

By using a plurality of N counters, an improvement is provided relative to the above mentioned disadvantage. Each counter is put into operation, that is, started and stopped at a zero-cross interval which is shifted by one period from the start and stop of the next counter in the sequence. Each count counter successive during N intervals between zero-cross points one after the other. The absolute quantity of error due to distortion in the location of the zero-cross points when counting N zero-cross detection intervals is the same as that when counting only one zero-cross detection interval. Therefore, by counting over intervals representing N zero-cross points, the signal to noise ratio increases N times.

Use of N-counters enables the reliable demodulation of a signal having a high noise level. However, a counter technique has yet another disadvantageous feature in that distortion of the demodulated binary signal is large. This occurs because the point where a demodulating output changes from zero to one or from one to zero in a counter system is confined to occur only at a zero-cross point of the FSK signal.

The FSK demodulation circuit in accordance with the invention provides a technique for decreasing the distortion by providing a demodulated output which changes not at the zero-cross point in the FSK signal but at a point delayed by a suitable amount.

Figure 2A:
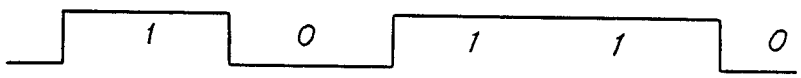
FIGS. 2A to 2F are waveforms of an original binary signal and signal waveforms for FSK transmission and demodulation in a demodulation circuit in accordance with the invention.
Figure 2B:
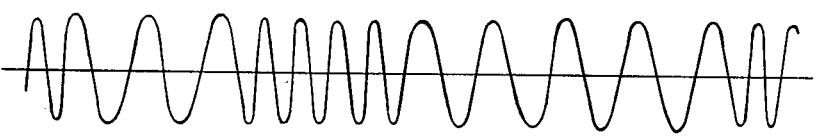
Figure 2C:
Figure 2D:
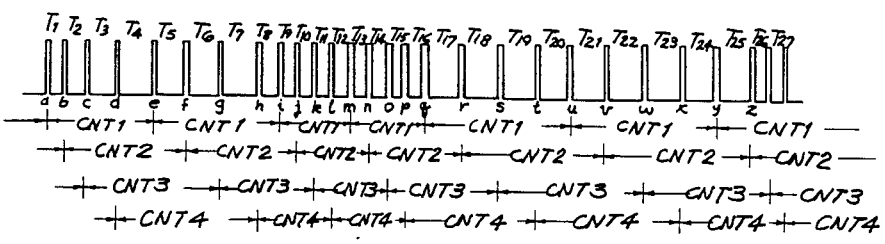
Figure 3:
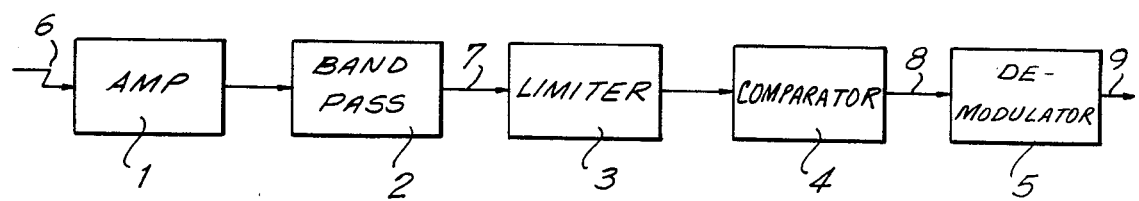
FIG. 3 is a functional block diagram of a FSK demodulation circuit in accordance with the invention using a counter technique.
Figure 4:
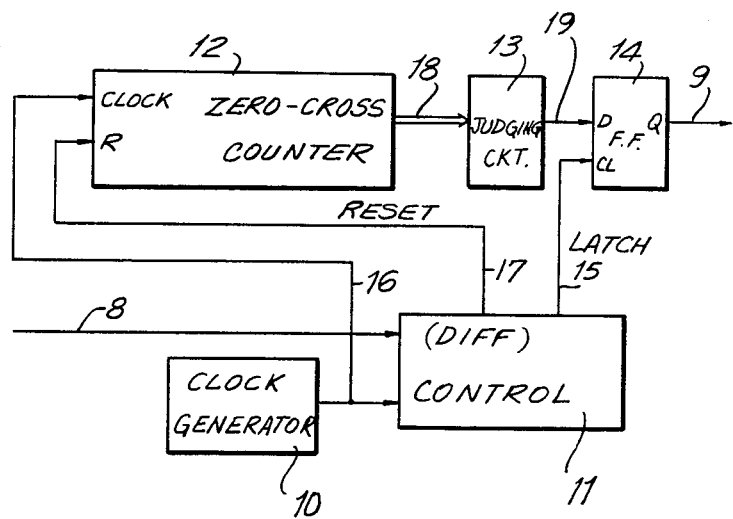
FIG. 4 is a block diagram of the demodulation circuit of the block diagram of FIG. 3.

The invention is described with reference to the different circuit embodiments. FIG. 3 is a functional block diagram of a generalized demodulation device using a counter technique, and FIG. 4 is a block circuit diagram of the demodulation circuit 5 of FIG. 3 as explained more fully hereinafter. FIG. 2 illustrates signal waveforms at several locations in the circuits of FIGS. 3 and 4. FIG. 2A is an original binary signal which is modulated in FSK at the sending side and sent in the form shown in FIG. 2B through a transmission line. The received FSK signal 6 is amplified through a receiving amplifier 1 in a range so as not to allow the amplitude to reach the level where clipping occurs. A band pass filter 2 selects only the modulating frequency band of the FSK signal, and the signal is then limited in amplitude by a limiter 3 so that an operational amplifier, or the like, will not be saturated. The signal is then transformed to a digital binary signal 8 in a comparator circuit 4. The wave form output 7 from the band pass filter 2 and the output signal 8 from the comparator 4 are respectively shown in FIGS. 2B and 2C.

Figure 2E:

The output signal 8 from the comparator 4 is demodulated in the demodulation circuit 5 and transformed to a demodulation signal 9 as shown in FIG. 2E. In further amplifying upon the demodulation circuit 5 by means of FIG. 4, the output 8 from the comparator 4 is differentiated by a differential circuit in a control circuit 11 and is transformed to a zero-cross signal as shown in FIG. 2D. A zero-cross signal pulse is generated when the output 7 from the band pass filter as shown in FIG. 2B crosses the zero level in either direction. Therefore, by counting during the zero-cross detection intervals, the frequency of the modulated waveform can be obtained. From the count value, an original binary signal can be evaluated, that is, whether it is a one or a zero.

A zero-cross counter 12 counts during the zero-cross detection interval. A value, corresponding to a half of a period of the mean frequency of the two different frequencies in the FSK modulating waveform, is set in a demodulation output judging circuit 13. This count which would be accumulated in half of the period of the mean or average frequency of the two different frequencies is hereinafter referred to as the threshold interval. A practical threshold interval is experimentally determined in view of the influence of the filter, line, and like factors. The judging circuit 13 determines whether a signal is one or zero by a comparison in values between the output 18 from the counter 12 and the predetermined threshold interval value. A demodulation output signal 19 is inputted to a demodulating output flip-flop 14, and the signal output 19 is stored in the flip-flop until the next zero-cross detection interval is counted. In other words, the signal output 9 from the demodulation circuit is maintained at a constant value during the count of a zero-cross detection interval and is made changeable only at a zero-cross point.

A clock signal 16 for the counter is generated through a clock generating circuit 10 and this clock signal 16 is also transmitted to the control circuit 11 so that controlling signals are synchronized with this clock signal. A reset signal 17 for starting operation of the counter 12 and a latch signal 15 for inputting the demodulation signal 9 obtained from the counter value comparison to a flip-flop 14, are generated based on the differentiated signal (FIG. 2D) of the output 8 from the comparator 4.

As stated above, because a counter system is digitally demodulated, it is adaptable for integration of a circuit chip and requires no particular adjustment and has no fluctuation in performance over a long period of time. However, a disadvantage is quite unavoidable with a counter system in that the demodulation of a signal having a low signal to noise ratio may be difficult to demodulate due to susceptibility to errors in detecting the zero-cross points due to noises in the signals. In Fig. 2D, for example, if a zero-cross point u is shifted by an interval of dt to the right because of noise, the period T20 becomes T20+dt and the period T21 becomes T21−dt.

Figure 2F:

Therefore, according to the value of dt, the value of the count in the period T21−dt may possibly be less than that of the threshold interval, which can cause an erroneous demodulation as shown in FIG. 2F at u'. There it is indicated that at the end of the period T21, the output signal 2F goes to the zero level when, in fact, a one level would be proper. In order to resolve or at least minimize this problem, a circuit is used having a plurality of counters, that is, the number N of counters is equal to or greater than two for counting during the zero-cross detection intervals.

Figure 5:
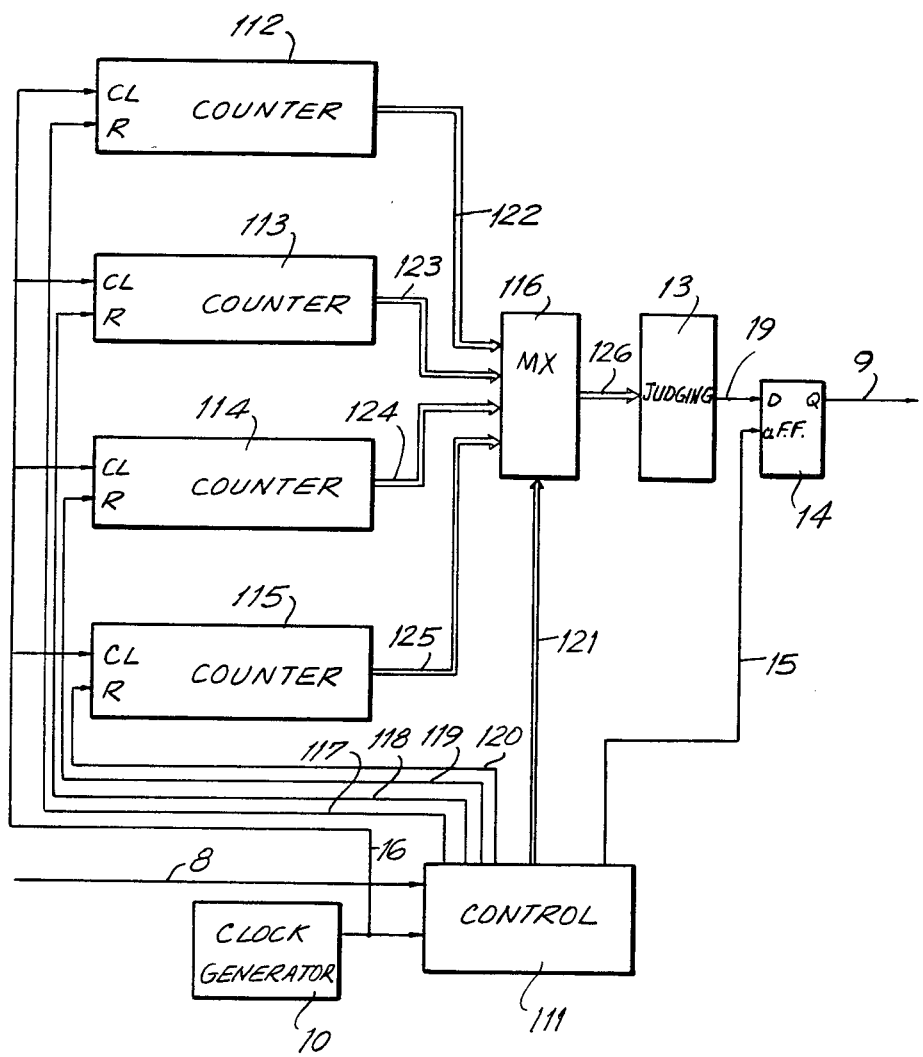
FIG. 5 is a functional circuit diagram of a FSK demodulation circuit in accordance with the invention having counter measures against noise in the transmission signals.

When N is equal to four, the block diagram of FIG. 4 is modified as shown in FIG. 5, wherein four similar counters 112-115 are provided which are different in use from the counter 12 of Fig. 4 in that each counter is used to count for four zero-cross intervals of detection. The counters begin counting in sequence, being respectively delayed by one interval between zero-cross points such that one counter begins counting at every zero-cross point. With reference to FIG. 2D, the counter 112 begins counting at a zero-cross point a, the counter 113 begins counting at the zero-cross point b, the counter 114 begins counting at the zero-cross point c, and the counter 115 begins counting at the zero-cross point d. They respectively count four successive zero-cross detection intervals.

The counter 112 counts for an interval indicated (FIG. 2D) as CNT1, the counter 113 counts for an interval indicated as CNT2, the counter 114 counts for an interval indicated as CNT3 and the counter 115 counts for the interval indicated as CNT4.

A multiplexer 116 selects between the outputs 122-125 from the counters 112-115, respectively, as each counter completes its count, that is, in sequence. The counters are controlled to begin counting by reset signals 117-120 which are generated by the control circuit 111. The multiplexer 116 is controlled to select the output from a counter by a select signal 121 which is also generated by the control circuit 111.

When the point u is shifted to the right through error by an interval dt as would be shown in FIG. 2D, each counter in the circuit of FIG. 5 counts for the time of four zero-cross detection intervals. With the distortion of dt, the count values obtained from each counter, one after the other, represent the periods (T16+T17+T18+T19) /4, (T17+T18+T19+T20+dt) /4, (T18+T19+T20+T21) /4, (T19+T20+T21+T22) /4, (T20+T21+T22+T23) /4 and (T21−dt+T22+T23+T24) /4, respectively.

It should be noted that the dt values are cancelled out in those intervals which include both the T20 and T21 portions. Accordingly, the error in the count value is decreased to dt/4 when the count in each counter is over the interval of four zero-crossings. In other words, the signal to noise ratio is improved four times as compared with the signal to noise ratio of the circuit shown in FIG. 4. In general, the signal to noise ratio is improved N times by employing N counters. Thus, the problems of noise are reduced in a counter system by the above described method of using a plurality of counters.

A counter system, however, has a further disadvantage caused by the nature of its operation such that distortion of the demodulated binary signal is large because a demodulated output is limited to change only at a zero-cross point whereas the original binary signal may not change only at zero-cross points. This situation is described with reference to FIG. 6, wherein an embodiment having one counter used for counting during the zero-cross detection periods is described. Similar descriptions hold for an emobdiment employing N counters, that is, regardless of the number of counters, although there is a small difference as the number of counters changes.

Figure 6A:
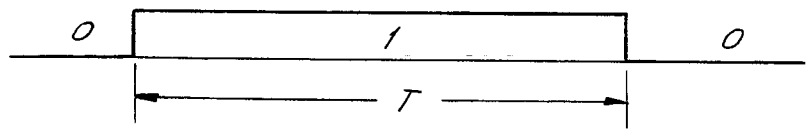
FIG. 6A—FIG. 6E are waveforms of the basic counter system of FIG. 5 in accordance with the invention.
Figure 6B:
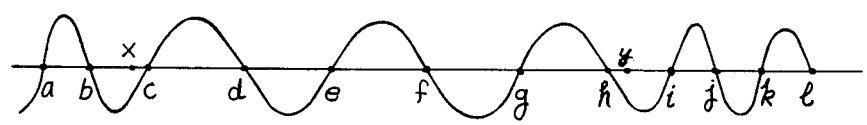
Figure 6C:
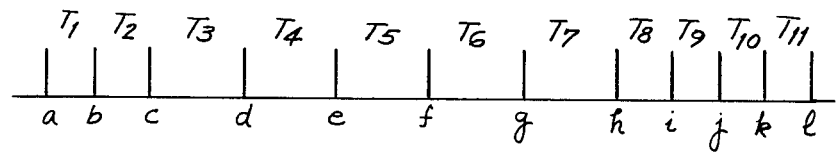

FIG. 6A shows an original binary signal at the transmitting side. Given a modulating speed (baud rate) as indicated by waveform B, a time width T of one bit outputted from an original binary signal is equivalent to 1/B. FIG. 6B shows a FSK signal which is received through a transmission line after modulation of the original binary signal FIG. 6A. FIG. 6C is the zero-cross waveform signal produced from the signal 6B in the manner described above and FIG. 6D is a demodulation signal which is obtained by comparing between the count of the zero-cross intervals and the threshold interval. The signal width Te corresponds but does not equal the signal width T of the original binary signal.

It should be noted that the intervals T2 and T8 are of greater duration then T1, T9, T10, T11 as both frequencies occur during periods T2 and T8 where the original binary signal changes level.

Because the time width T2 from the zero-cross point b to the zero-cross point c is narrower than the threshold interval, a zero is outputted at the point c as a demodulated output corresponding to T2. Similarly, a high level 1 is outputted at the point d as a demodulated output corresponding to the period T3. The output 1 continues high and at the point h is still high as a demodulated output corresponding to the period T7. At the point i a zero is outputted as a demodulated output corresponding to the period T8. Thus, since a demodulated output changes only at a zero-cross point, a delay time from the changing point of the original binary signal to that of the demodulated signal is not constant. As a result, the time width Te of a bit of a demodulated output is a variable within limits.

In the embodiment as indicated by the waveforms of FIG. 6, a demodulated output is changed at the point d with a delay $\Delta x$ as compared to changing point x from zero to one in the original binary input. Also, the demodulated output changes at the point i with the delay of $\Delta y$ as compared to the changing point y from one to zero in the original binary input. Therefore, Te is equal to $T+(\Delta y-\Delta x)$. When the maximum and minimum values of Te are respectively represented by Temax and Temin, then (Temax−T)/T and (Temin−T)/T are designated as distortion. It is another disadvantage with a counter system of FSK demodulation that this distortion is large.

A FSK demodulation circuit in accordance with the invention for decreasing the above mentioned distortion is shown in FIG. 7. In a FSK demodulation circuit using a circuit as shown in FIG. 6, the value of $\Delta y - \Delta x$ as shown in FIG. 6 is reduced so as to approach zero and to decrease distortion by providing a delay compensating circuit for delaying a demodulated output. That is, the variation in delay time from the changing point x of the original binary signal to that of the demodulated output is decreased.

Figure 6D:
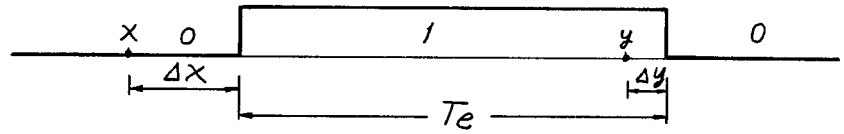
Figure 6E:
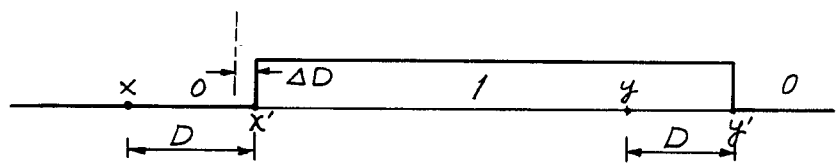

FIG. 6E illustrates an ideal demodulated signal with delay, which is outputted from a demodulation circuit in accordance with this inention. A constant delay D from the changing point x of the original binary signal to the changing point x' of the demodulated output is determined as the maximum of $\Delta x$ or $\Delta y$ for any signal as shown in FIG. 6D. At each zero-cross point, the demodulated signal is obtained by the comparison between the threshold interval and the count accumulated in the zero-cross interval measured from the previous zero-cross point, as described above. In the case where the demodulated signal is different from the signal outputted at the previous zero-cross point, that is, the output signal would change from zero to one or from one to zero, the demodulated signal is not immediately outputted at the zero-cross point but is outputted after a delay time is suitably applied.

The delay time at a zero-cross point where the demodulated signal is changed, for example, at the point d, approximates the changing point x of the original binary signal. It is obtained as the value $(D - \Delta x)$ which remains after subtracting the delay time $\Delta x$, from point x where the original binary input goes high to the point d, from the constant delay time D. Time $\Delta x$ from the estimated changing point x to the zero-cross point d of the original binary signal is the sum of the time $\Delta xc$ from x to the point c and the time $\Delta cd$ from the point c to the point d. This relationship may be written as $\Delta x = \Delta xc + \Delta cd$. $\Delta cd$ is equal to the time period T3 and $\Delta xc$ depends on the values of T2 and T3, characteristics of the line band pass filter and other factors. Accordingly, $\Delta x$ is obtained from the values of T2 and T3 provided that the characteristics of the line band pass filter and similar circuit factors are measured by experiment. Thus, compensating delay time $\Delta D$ is obtained by subtracting $\Delta x$ from D. The resultant output using the fixed delay D produces a reliable reproduction of the period T of the original signal 6A.

A FSK demodulation circuit to meet the requirements described above is shown in FIG. 7. A control circuit 111, zero-cross detection interval counters 112-115 and multiplexer 116 are similar to those shown in FIG. 5. The FSK demodulation circuit also includes registers 201, 202. A clock signal 15 for the registers is obtained from the zero-cross signals. Therefore, the register 201 stores the count value of the zero-cross detection interval at the present zero-cross point. The register 202 stores the count value of the cross detection interval at the previous point. A demodulating output detection or judging circuit 13 generates a demodulated signal 19 from the output of the register 201. And the signal 19 is inputted to the D input terminal of the demodulating output flip-flop 14. When the demodulated signal 19 is different from that at the previous point, the demodulated signal is not immediately inputted into the flip-flop 14. After being delayed by a delay compensating circuit 203, the demodulated signal is inputted into flip-flop 14 by a latch pulse 206. The delay time is determined by the outputs 204, 205 from the registers 201, 202 respectively. The delay compensating circuit 203 is a circuit for estimating the changing point of the signal and outputting a demodulated signal with delay time corresponding to the estimated time when the demodulated signal is changed. A delay time is obtained by counting the values of zero-cross detection intervals, that is, the outputs 204, 205 from the registers 201, 202, before and after the demodulated signal is changed. It is simple in practice to use a ROM, that is, a read-only memory, as a delay compensating circuit providing the delay time. That is, the register outputs 204, 205 are outputted to the ROM, Then, the ROM outputs a delay time which corresponds with the data obtained from the register outputs 204, 205.

As stated above, a FSK demodulation circuit as illustrated in FIG. 7 is provided with a demodulated output having little distortion by outputting a demodulated signal with a suitable delay time.

Figure 8:
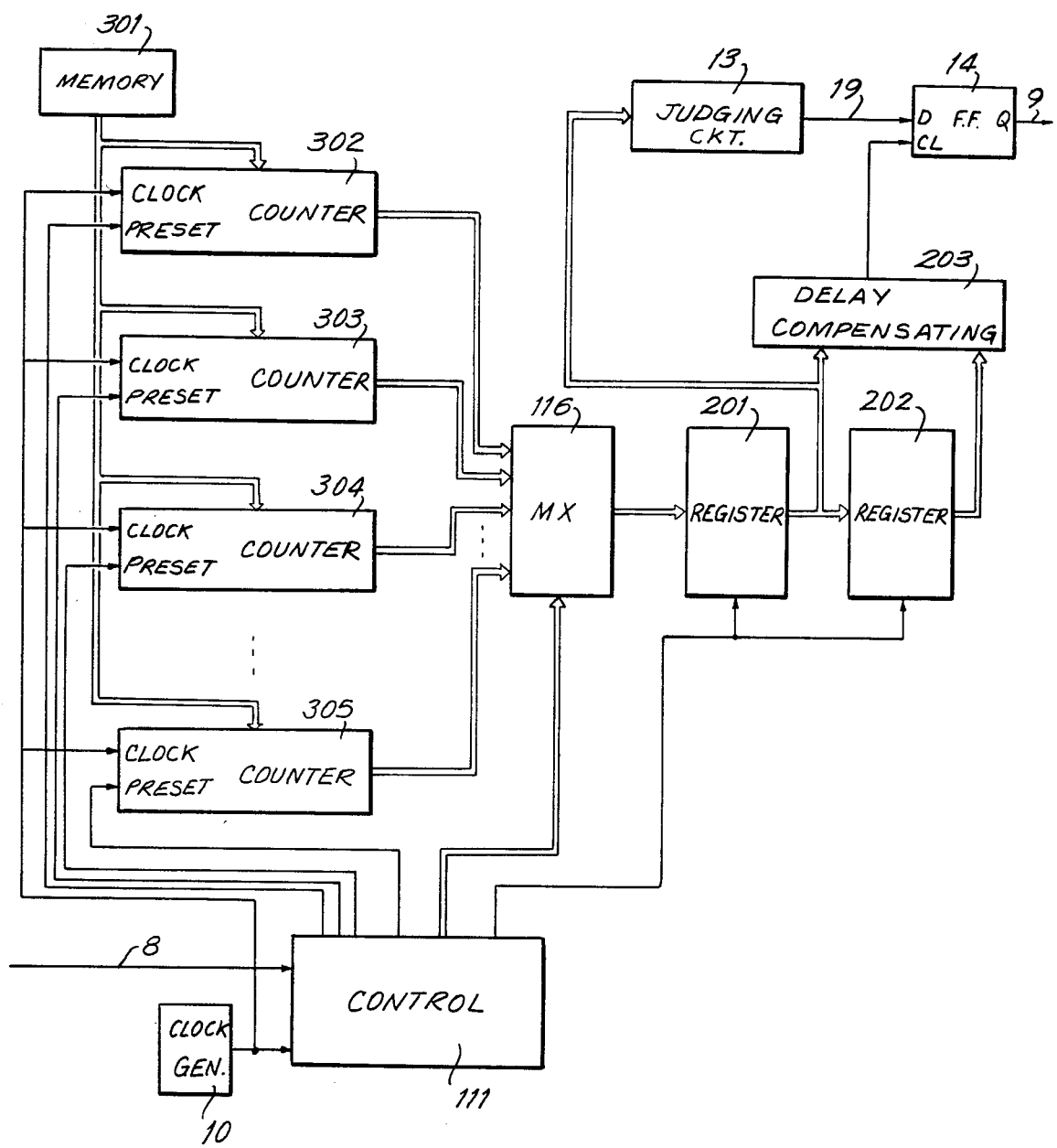
FIG. 8 is a circuit block diagram of an alternative embodiment of a FSK demodulation circuit in accordance with the invention.

FIG. 8 represents an alternative embodiment of a FSK demodulation circuit in accordance with the invention, improved over the construction of FIG. 7. The circuit of FIG. 8 demodulates a signal with the same reliability as does the circuit of FIG. 7. Only the construction of a counter for counting the zero-cross detection interval is different from that of the counters shown in FIG. 7. Counters 112-115 in FIG. 7 are each reset at the time of starting to count for a particular zero-cross detection interval and they obtain count values accumulated during the zero-cross detection intervals. An input signal 8 is then demodulated by a comparison of the count values with the threshold interval as described above.

On the other hand, counters 302-305 of FIG. 8 are comprised of pre-settable counters wherein 2's complement of the threshold interval is preset at the time of starting to count. The 2's complement is a negative number of the threshold interval. For example, the 2's complement corresponds to $-A$ when the threshold interval is A. At the time when counting is completed, the counter a outputs the value obtained by subtracting the threshold interval from the count value of the zero-cross detection interval. The input signal 8 is thus demodulated depending on whether the obtained value from the counter is positive or negative. The 2's complement of the threshold interval is stored in a memory 301.

Advantages of a FSK demodulation circuit employing presettable counters as shown in FIG. 8 are described hereinafter. A most suitable threshold interval is easily obtained by testing the demodulated output as the value of the threshold interval stored in memory is varied slightly. Also, a demodulating circuit to FSK signal of the optional frequency is constructed only by storing a delay time in the threshold interval stored memory 301 and in the delay compensating circuit 203 to change the contents of the memory, leaving other components as they are.

Further, because signals of counters 302-305 are outputted as differences between zero-cross detection intervals and the threshold interval, the number of bits to and from the registers 201, 202 is diminished. Therefore, the memory needed for storing the delay time in the delay compensating circuit 203 may be small. Also, as the most significant bit of the register 203 is a demodulated signal, a demodulated output judging circuit 13 is unnecessary in practice.

Figure 9:
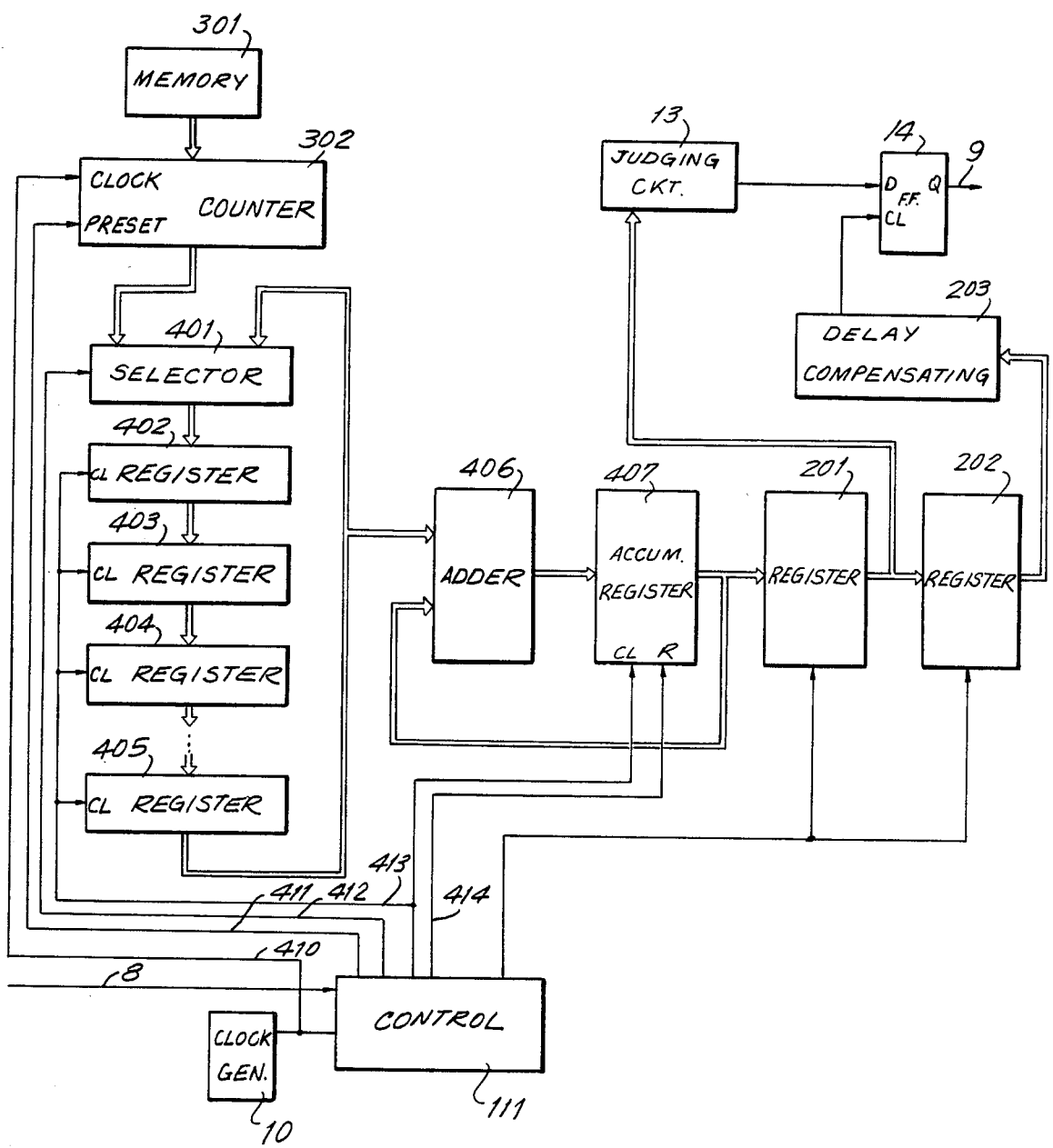
FIG. 9 is a circuit block diagram of another alternative embodiment of a FSK demodulation circuit in accordance with the invention.

FIG. 9 represents another alternative embodiment of a FSK demodulation circuit in accordance with the invention which is further improved over the construction of FIG. 8. Both circuit constructions are the same in their ability to demodulate the incoming signal. With regard to FIG. 8, however, N-counters 302–305 count N zero-cross detection intervals respectively (see FIG. 2). To the contrary, with reference to FIG. 9, only one presettable counter 302 is used as a counter for counting one zero-cross detection interval. A series of count values obtained by counting a zero-cross detection interval is stored in order in N registers 402–405. Then, the accumulated count values of N zero-cross detection intervals is obtained by means of an adder 406 and an accumulating register 407. Therefore, the volume of hardware is decreased.

Counter 302, the presettable counter, counts one zero-cross detection interval at every zero-cross detection interval. The counter value is stored in a register 402 by means of selector 401. At that time, the contents of register 402 and the remaining registers 403–405 are respectively shifted to the following register. Then, the accumulating register is cleared. A round of contents from registers 402 to 405 is shifted and the sum of these contents are stored in the accumulating register 407 through the adder 406. This produces the same effect as in the case of measuring N periods. The value which is available at the output of the accumulating register 407 is the same as that out of the multiplexer 116 of FIG. 8. The registers 402–405 are for storing the difference between the zero-cross detection interval and the threshold interval, and require a lesser number of bits as compared with the counter 302.

The circuit in FIG. 9 eliminates much volume of hardware as compared to the circuit of FIG. 8 by using a single presettable 302 counter with registers 402–405 and adder 406 and register 407 in place of the four counters 302–305 and multiplexer 116. With reference to the FSK demodulation circuit as shown in FIGS. 8 and 9 in accordance with the invention, a FSK demodulation circuit can be constructed, provided that the threshold interval storing memory 301 and the delay storing memory in the delay compensating circuit 203 comprise a programmable read-only memory (PROM). A PROM is especially effective when a FSK demodulation circuit in accordance with the invention is integrated into a chip. That is, an integrated circuit can be used as a FSK demodulation circuit for the optional frequency by changing the contents in the PROM.

Figure 10:
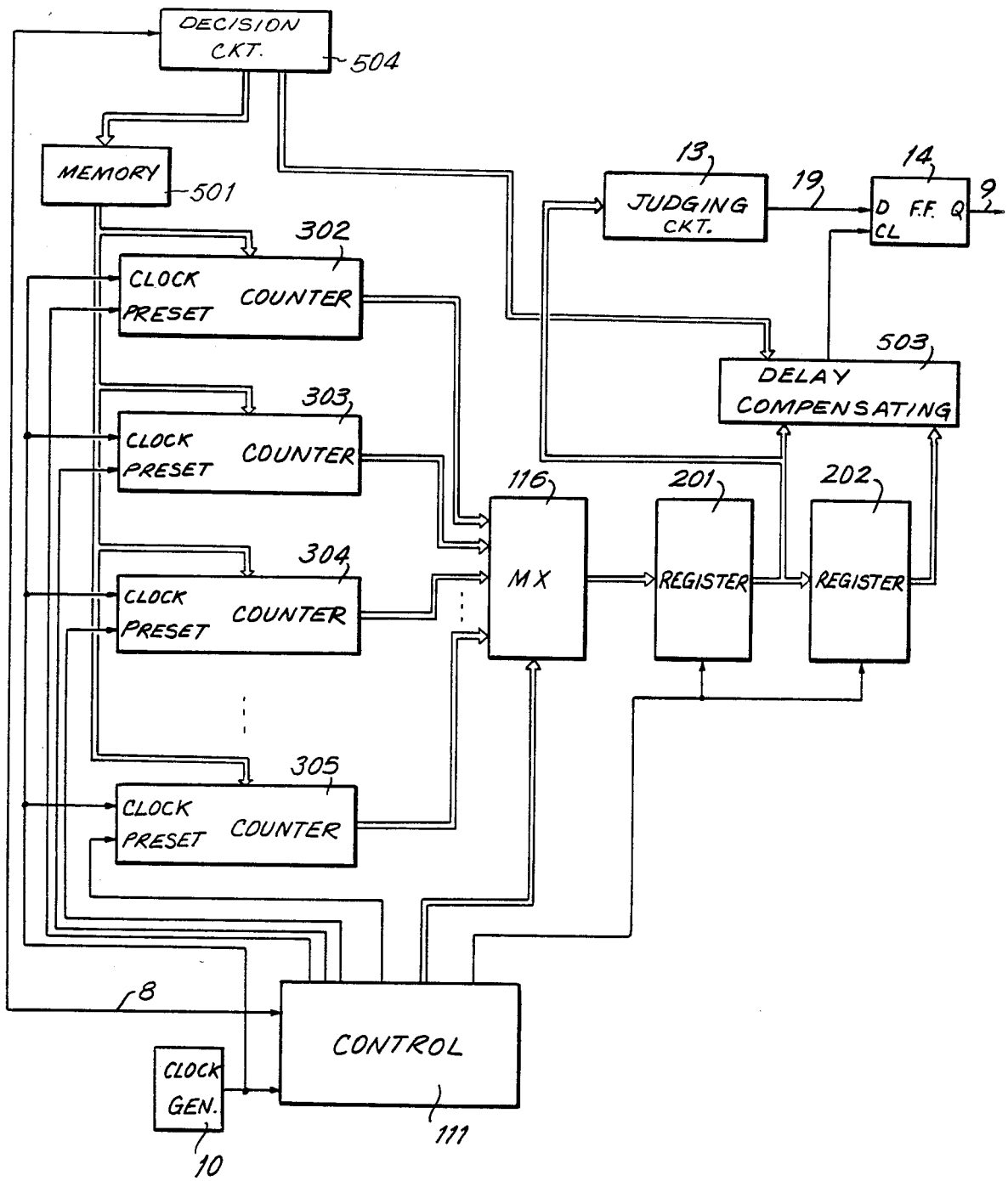
FIG. 10 is a circuit block diagram of another alternative embodiment of a FSK demodulation circuit in accordance with the invention.

Furthermore a best quality FSK demodulation circuit can be constructed by replacing the threshold interval storing memory 301 and the delay storing memory in the delay compensating circuit 203 with random access memories (RAM) and by adding a most-suitable-value decision circuit for deciding the contents of the two RAMS. FIG. 10 represents an embodiment of this FSK demodulation circuit. 501 is a threshold interval storing memory. 503 is a delay compensating circuit provided with delay storing memory therein. These memories are constructed by RAM (random access memory), not by ROM (read only memory). The contents of the RAM are most suitably decided due to the condition wherein a FSK demodulation circuit is used. 504 is a most-suitable-value decision circuit for deciding the value of the RAM. This circuit will receive a test waveform from input signal 8 before FSK signal reception and decide from the test waveform the threshold interval and delay value to be stored in those random access memories.

The other parts of the circuit in FIG. 10 is identically corresponding to those in FIG. 8. The circuit as shown in FIG. 10 always normally operates independently on the condition wherein it is used, and produces a demodulated signal having very little distortion.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A circuit for demodulating an FSK signal that has first and second frequencies which respectively correspond to the high and the low of a binary signal, the circuit comprising:
    clock means having a train of clock pulses as an output;
    detector means responsive to an FSK input signal to provide a zero-cross output signal having zero-cross intervals;
    N counter means, where N is equal to or greater than 2, each counter means having the clock pulses as an input and responding in succession to count the clock pulses in N zero-cross intervals of the zero-cross signal to provide an output;
    means for dividing the output of each counter means in sequence by N to provide an average count value for each zero-cross interval, the possible error in the count value for each interval so produced being decreased by 1/N;
    means for comparing each successive average count value with a predetermined threshold count value to provide a comparison signal output; and
    storage means having a demodulated binary signal as an output in which transitions in the output are delayed by the comparison signal.

2. A circuit for demodulating an FSK signal in accordance with claim 1, in which the counter means, the dividing means, and the storage means are each responsive to a respective control signal;
    the demodulating circuit further comprising:
    control means having the clock signal and the zero-cross signals as input and having a plurality of control signals as outputs.

3. A circuit for demodulating an FSK signal in accordance with claim 1, in which the predetermined threshold count value is experimentally determined by measuring at least one of the influence the transmission line and the band pass filter upon a received signal.

4. A circuit for demodulating an FSK signal in accordance with claim 1 in which each of the N counters is pre-settable and further comprising:
    memory means for supplying the 2's complement of the predetermined threshold count value to each of the N counters when counting is initiated.

5. A circuit for demodulating an FSK signal in accordance with any one of claim 1 and claim 4 in which the predetermined threshold count value is the most suitable threshold interval obtained while slightly varying the threshold interval.

6. A circuit for demodulating an FSK signal in accordance with claim 1 in which the predetermined threshold count value is the most suitable value obtained by receiving a test wave form before an FSK signal.

7. A circuit for demodulating an FSK signal in accordance with claim 1 in which the N counter means further comprises:
- single counter means for successively counting each zero-cross interval to provide a count value therefor;
- N register means, each storing, in succession, a count value output of the single counter means; and
- adder means having the N count values stored in the register means as an input and having the sum of the N count values as an output.

8. A circuit for demodulating an FSK signal in accordance with claim 7 in which the single counter means is pre-settable and further comprising:
- memory means for supplying the 2's compliment of the predetermined threshold count value to each of the N registers at the time of starting to count.

9. A circuit for demodulating an FSK signal in accordance with claim 1 and further comprising:
- means for storing the predetermined threshold count value;
- decision means responsive to an input test wave form received prior to the FSK signal for deciding the most suitable value of the threshold count value.

10. A circuit for demodulating an FSK signal in accordance with claim 9 in which each of the N counters is a presettable counter and further comprising:
- means for setting a threshold count value stored in the memory means as 2's compliments to each of the N counters prior to counting the N zero-cross intervals.

11. A circuit for demodulating an FSK signal in accordance with claim 9 in which the N counters comprise;
- single counter means for counting each successive zero-cross interval to provide an output;
- N register means each having a count value for a succeeding zero-cross interval as an input; and
- in which the adder means have the N count values stored in succession in each register means as inputs.

* * * * *